United States Patent [19]

Powers et al.

[11] Patent Number: 5,065,185
[45] Date of Patent: Nov. 12, 1991

[54] MULTI-FUNCTION DETECTING DEVICE FOR A DOCUMENT REPRODUCTION MACHINE

[76] Inventors: Edward A. Powers, 1760 Jackson Rd., Penfield, N.Y. 14526; Charles J. Urso, 1130 Wall Rd.; Richard F. Lehman, 785 John Glenn Blvd., both of Webster, N.Y. 14580

[21] Appl. No.: 396,161

[22] Filed: Aug. 21, 1989

[51] Int. Cl.$^5$ ............................................. G03G 21/00
[52] U.S. Cl. .................................... 355/208; 355/214; 355/311; 355/317
[58] Field of Search ............... 355/208, 214, 246, 230, 355/483, 203, 311, 71, 75, 231, 317; 250/332, 339, 370.06, 370.08

[56] References Cited

U.S. PATENT DOCUMENTS

| | | | |
|---|---|---|---|
| 4,456,372 | 6/1984 | Yamauchi | 355/75 |
| 4,472,046 | 9/1984 | Kohyama | 355/214 X |
| 4,541,713 | 9/1985 | Maekawa | 355/75 |
| 4,620,781 | 11/1986 | Miyamoto | 355/3 |
| 4,630,127 | 12/1986 | Fuwa | 355/311 X |
| 4,651,001 | 5/1987 | Harada et al. | 250/332 X |
| 4,679,068 | 7/1987 | Lillquist et al. | 250/332 X |
| 4,745,489 | 5/1988 | Kashiwagi et al. | 355/214 X |
| 4,749,872 | 6/1988 | Asada et al. | 250/578 |
| 4,819,035 | 4/1989 | Arai et al. | 355/71 X |

*Primary Examiner*—A. T. Grimley
*Assistant Examiner*—Robert Beatty

[57] ABSTRACT

An optical sensing array is adapted to filter incident light so as to generate two output electrical signals from two different portions of the array. The sensing array, which can be a linear CCD array, is assembled with a glass filter overlying the array, the filter being coated with a material which transmits light over a selected wavelength. One portion of the glass filter is uncoated. Thus, a light source incident on the array will activate two separate areas of the array; one underlying the open window and the other underlying the overcoated portion. The results in two different responses over different portions of the wavelength and results in generation of two electrical signals of different levels, representing different detected wavelengths of light. These electrical signals are useful to represent different functions; for example, various characteristics of said background density and size of a document being copied on a xerographic copier.

7 Claims, 3 Drawing Sheets

MULTI-FUNCTION DETECTING DEVICE FOR A DOCUMENT REPRODUCTION MACHINE

BACKGROUND AND INFORMATION DISCLOSURE STATEMENT

This invention relates generally to a document reproduction machine and, more particularly, concerns a discrimination system for automatically sensing the position, size, and background density on an original document being copied.

In prior art document imaging systems, it is known to determine various features relating to the original document so that appropriate adjustments may be made to xerographic stations in the overall system. For example, when a document is placed on a platen and incrementally scanned by an illumination source/mirror assembly, it is important to know the position, or lead edge of the document so that the copy media being moved into the transfer zone will be properly registered. For systems utilizing a plurality of paper trays containing sheets of different sizes, it is also important for the system to detect the dimensions of the original document so that the proper copy tray can be activated. Further, document size is important for systems requiring document edge and side erase further downstream of the exposure station. A third function required for many systems is the ability to detect the background density of documents having a background other than white so that appropriate adjustments can be made to the image development system. All of these functions have been implemented in the prior art by devices which sense either singly or in some combination, the particular document characteristics and, which generate signals which are sent to the appropriate xerographic stations. Some examples of representative prior art patents are as follows:

U.S. Pat. No. 4,456,372 to Yamauchi, discloses the use of a transparent glass table and a document detecting member for detecting document density and size of the document automatically once the platen cover is lowered. U.S. Pat. No. 4,541,713 to Maekawa discloses a platen cover with various different colored portions used in conjunction with a light receiver for determining document size. U.S. Pat. No. 4,620,781 to Miyamoto, discloses the use of a black platen cover for determining document size and absorbing reflected light. U.S. Pat. No. 4,749,872 to Asada et al. discloses the use of a CCD sensor array and mirror combination that senses document image and a reference marker for determining document location.

None of the above references discloses a sensing system which simultaneously enables all these functions; document lead edge (position), size, and document background density. To perform the lead edge and document size function, it is necessary to provide adequate optical contrast between the usually white document and the overlying platen cover. This can be accomplished by utilizing a colored platen cover and an appropriate optical filter to limit the sensor response. However, this requirement is incompatible with that of document background sensing since, for this function, it is desirable that the response of the CCD be similar to the photoreceptor response (e.g., it should sense the same light that is being projected on the photoreceptor).

According to the principles of the present invention, the three functions described above are enabled by using an array detector such as a charge-coupled device (CCD) sensor used in conjunction with a glass having an interference coating or a spectrally selective filter overlying the glass filter save for one "window" area. With this combination, the major portion of this sensor detects the scanned image through the wavelength portion of the color chosen to be transmitted through the interference filter. That portion of the sensor generates the signals which represent document position and size. The transparent window portion receives unfiltered light at that portion of the sensor and generates a second signal representing document background density. More particularly, the invention relates to a document reproduction machine for copying original documents placed on a transparent platen, the combination including means for scan/illuminating said document and for projecting a latent image of said scanned document on a photosensitive surface, sensing means positioned on the image side of said projecting means for discriminating between the document being copied on the platen and the area surrounding the document and for generating signals representing document size and position on said platen, said sensing means further adapted to sense the background density of said document and to generate electrical signals representative of said background density, and control means to digitize said sensing means output signals and to generate signals to adjust the operation of a plurality of xerographic stations.

DESCRIPTION OF THE INVENTION

While the present invention will hereinafter be described in conjunction with an embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
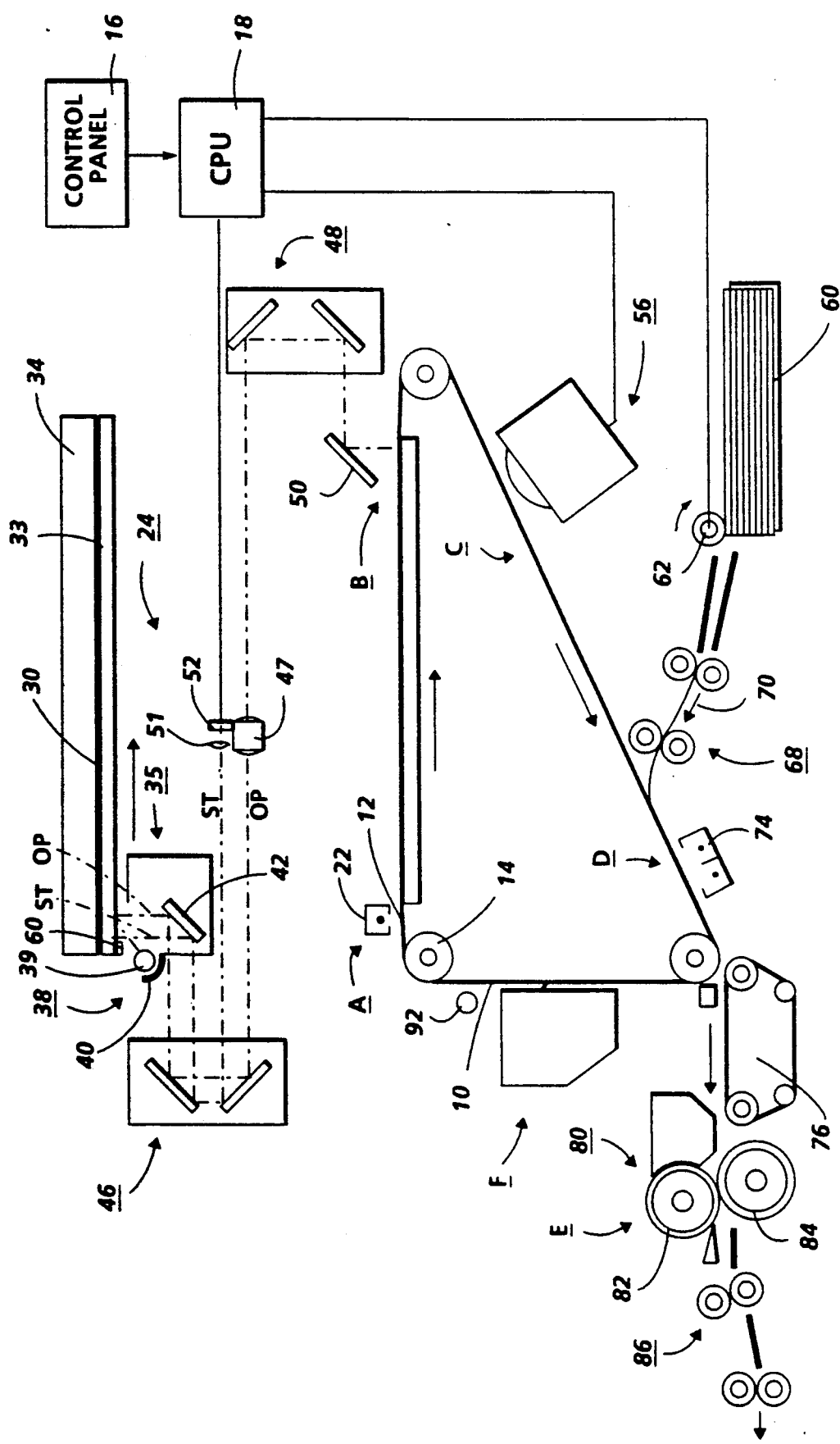
FIG. 1 shows a schematic side view of a document copying system which incorporates the multifunction device of the present invention.

For a general understanding of the features of the present invention, reference is made to the drawings. In the drawings, like reference numerals have been used throughout to designate identical elements. FIG. 1 schematically depicts the various components of an electrophotographic printing machine incorporating the features of the present invention therein. Inasmuch as the art of electrophotographic printing is well known, the various processing stations employed in the FIG. 1 machine will be shown hereinafter schematically and their operation described briefly with reference thereto.

Turning now to FIG. 1, the electrophotographic printing machine uses a photoreceptor belt 10 having a photoconductive surface 12 formed on a conductive substrate. Belt 10 moves in the indicated direction, advancing sequentially through the various xerographic process stations. The belt is entrained about a drive roller 14 and two tension rollers.

In operation, the operator may select the number of copies being reproduced as well as of adjusting any of the parameters within the various processing stations. This is achieved by keying in the required adjustment and number of copies at the control panel, indicated generally by the reference numeral 16. Control panel 16 is electrically coupled to a centralized processing unit, indicated generally by the reference numeral 18. Preferably, centralized processing unit (CPU) 18 is a microprocessor which is electrically connected to the various processing stations within the electrophotographic printing machine so as to control their operation.

With continued reference to FIG. 1, a portion of belt 10 passes through charging station A where a corona generating device, indicated generally by the reference numeral 22, charges photoconductive surface 12 to a relatively high, substantially uniform, negative potential.

Figure 2:
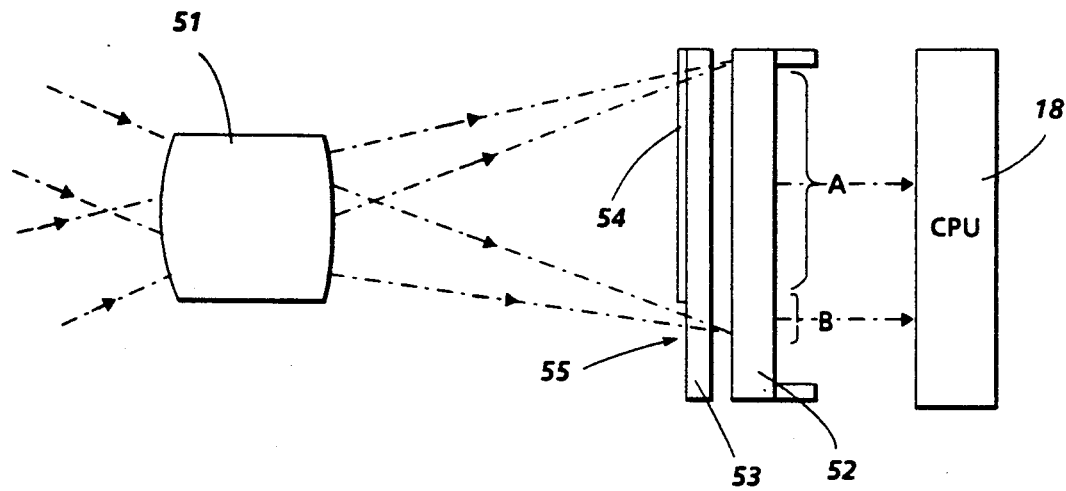
FIG. 2 is an enlarged view of the multifunction detector and its bilevel outputs.

Next, the charged portion of photoconductive surface 12 is advanced through an imaging station B. The imaging station includes an exposure system, indicated generally by the reference numeral 24. An original document 30 is positioned face down on a transparent platen 33 and registered along a selected registration edge. A platen cover 34 is pivoted from an open position to that overlying the document as shown. In a preferred embodiment, the underside of the platen coating is red-reflecting. Optics assembly 35 contains the optical components which incrementally scan-illuminate the document from left to right and project a reflected image onto surface 12 of belt 10, forming a latent image of the document thereon. Shown schematically, these optical components comprise an illumination lamp assembly 38, comprising an elongated tungsten illumination lamp 39 and associated elliptical reflector 40. Assembly 38 and full rate scan mirror 42 are mounted on a scan carriage (not shown) adapted to travel along a path parallel, to and beneath, the platen. Lamp 39, in conjunction with reflector 40, illuminates an incremental line portion of document 30. The reflected image is reflected by scan mirror 42 to corner mirror assembly 46 which is adapted to move at $\frac{1}{2}$ the rate of carriage mirror 42. The document image is projected along optical path OP through lens 47 and reflected by a second corner mirror assembly 48 and by belt mirror 50, onto surface 12 to form thereon an electrostatic latent image corresponding to the information areas contained within original document 30. The light image is also reflected along a second optical path ST following a path reflected from mirror assembly 46 through reduction lens 51 onto a solid state photosensor array 52. Array 52, in a preferred embodiment, comprises a 1024 element CCD array of sufficient width to sense the entire image projected through lens 51. The array shown in an enlarged view in FIG. 2 is assembled with a glass filter 53 having interference coating 54 applied on the surface facing lens 51 (the coating may also be on the other side of the filter facing array 52). When using the red-reflecting platen cover 34, a green filtering coating 54 is used. Other combinations; for example, a yellow platen cover with a blue filter may be used. These combinations of platen covers and complementary filters are selected to provide a clearly defined detection level at the edge of the document for size and registration detection as described below. The coating is applied over the entire surface of filter 53 save for a section left uncoated and this area is designated hereafter as window 55.

Continuing with the system description at the development station C, a magnetic brush development system, indicated generally by the reference numeral 56, develops the electrostatic latent image with toner particles. The developer unit is cammed into and out of its development zone in response to signals from CPU 18. The output voltage from the CPU 18 is electrically coupled to the developers to regulate its operation, including application of the bias potential.

After development, belt 10 advances the toner powder image to the transfer station D. At the transfer station, a sheet of support material is moved into contact with the powder image. The sheet of support material is advanced to transfer station D by a sheet feeding apparatus, indicated generally by the reference numeral 60. Preferably, sheet feeding apparatus 60 includes a feed roll 62 contacting the uppermost sheet of a stack of sheets. Feed roll 62 rotates in the direction of the arrow so as to advance the uppermost sheet into the nip defined by forwarding rollers 68. Forwarding rollers 68 rotate in the direction of arrow 70 to transport the sheet into contact with photoconductive surface 12 of belt 10 so that the toner powder image developed thereon contacts the advancing sheet at the transfer station.

Preferably, the transfer station includes a corona generating device 74 which sprays ions onto the backside of the sheet. This attracts the toner powder image from photoconductive surface 12 to the sheet. After transfer, the sheet continues to move on conveyor 76, in the direction of the arrow, to fusing station E.

Fusing station E includes a fuser assembly, indicated generally by the reference numeral 80 which permanently affixes the transferred toner powder image to the sheet. Preferably, fuser assembly 80 includes a heated fuser roller 82 and a back-up roller 84. The sheet passes between fuser roller 82 and back-up roller 84 with the powder image contacting fuser roller 82. In this manner, the powder image is permanently affixed to the sheet. After fusing, forwarding rollers 86 advances the sheet to a catch tray (not shown) for subsequent removal from the printing machine by the operator. The photoreceptor surface is then cleaned at cleaning station F, and illuminated by lamp 92 prior to being recharged.

Referring to FIG. 2, the lens 51 forms an image of the portion of the document being scanned as well as a white reference strip 60 (FIG. 1) positioned under the platen just outside the scan area. Area A of the photosensor is activated and analog signals are generated by that portion of the array representing the position and dimensions of the document 30. Area B of the array underlying window 55, is activated and an analog signal generated by that portion of the array representing both information and background density (the difference between the white reference strip and the document background which may be a different (non-white) density). Since the background density gives rise to a signal of constant intensity, it can be identified in the controller as representative of said background level. The signals from sensor 52 are digitized within CPU 18. A preselected algorithm has been entered into controlling memory and is used to identify the position, dimensions, and background density and to generate signals which are used to adjust developer bias and control operation of the proper feed station.

Figure 3:
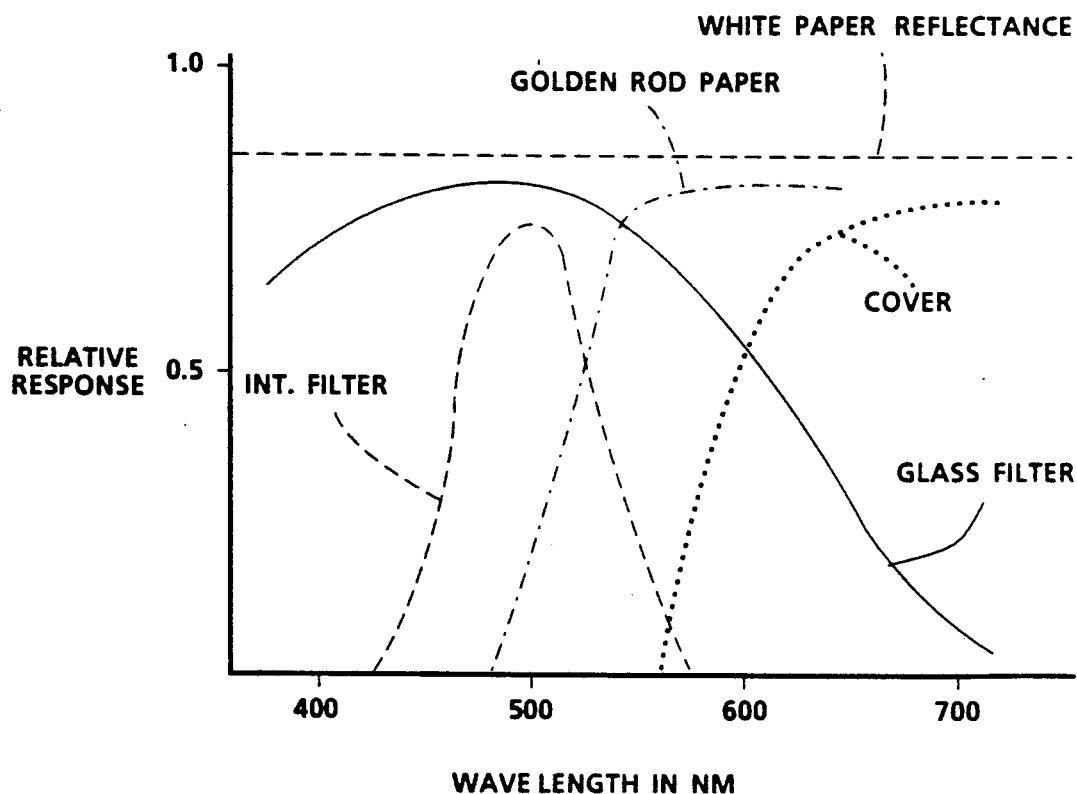
FIG. 3 is a plot showing relative spectral characteristics of the response system.

FIG. 3 shows the wavelength response of portions of the sensor to the light from the various components. The glass filter transmissivity is superimposed over the other parameters covering a wavelength over the visible spectrum. The interference (green) coating passes light in the green wavelength (400-600 nm). The red surface of the platen cover absorbs light in this wavelength range and is detectable because the signal abruptly terminates. A document with a goldenrod color background provides an intermediate density (between black and white) is detectable at 550 nm; the reflection of white background is a constant throughout the spectrum.

Figure 4:
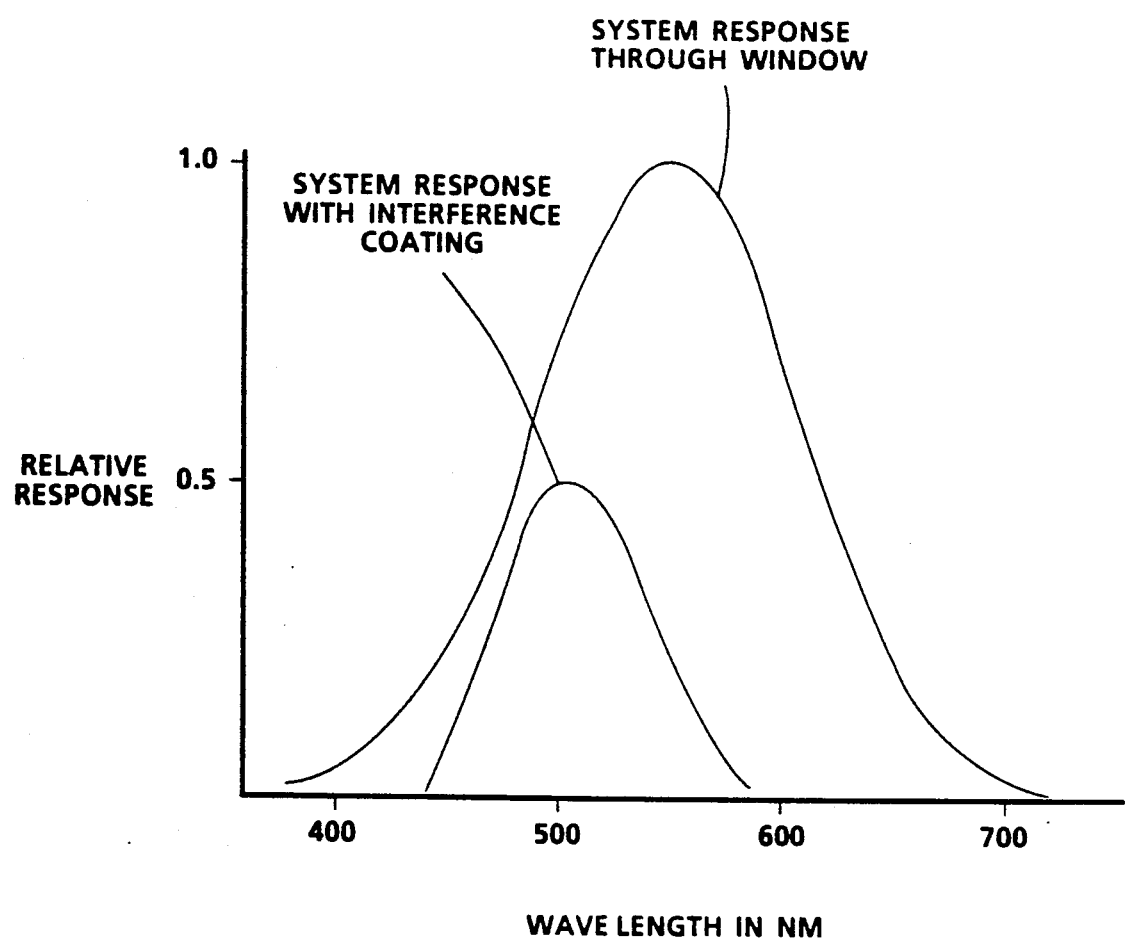
FIG. 4 is a plot of wavelength versus relative response of the detector with and without the interference filter.

FIG. 4 shows a comparison of the system response with only the glass and the response with the interference filter to show the separation of the two responses and the consequent ability of the photosensor outputs to distinguish therefrom.

While the invention has been described in the context of a multifunction detector in a electrophotographic reproduction device, its principles are applicable for use as a detector in other environments. For example, it could be used to classify documents by size or color for sorting purposes.

While the invention has been described with reference to the structure disclosed, it is not confined to the specific details set forth. For example, while the preferred embodiment has described as a document manually placed on a platen and held stationary by an overlying platen cover, the invention can also be practiced with a machine having automatic document handling capabilities. For this usage the document handler feed belt, or equivalent, will overly the document on the platen and would thus duplicate the function of the platgen cover. As a third possibility, for some systems it may not be necessary to use a cover at all. The invention can be practiced by simply placing the document being copied on the platen. For this case, the areas around the edges of the document appear black to the sensor, since no rays are reflected back into the optical path. This invention is intended to cover such modifications or changes as may come within the scope of the following claims:

We claim:

1. In a document reproduction machine for copying original documents placed on a transparent platen,
    means for scan/illuminating said document and for projecting a latent image of said scanned document on a photosensitive surface,
    sensing means for discriminating between the document being copied on the platen and the area surrounding the document and for generating signals representing document size and position on said platen, said sensing means further adapted to sense the background density of said document and to generate electrical signals representative of said background density and control means to digitize said sensing means output signals and to generate signals to adjust the operation of a plurality of xerographic stations.

2. The reproduction machine of claim 1 further including a cover overlying said document.

3. The reproduction machine of claim 1 wherein the sensing means comprises a reduction lens which faces the projected light source, a linear sensor array having a filter glass extending over its surface on the projection means face, said filter glass having coated thereon an interference filter material which is adapted to transmit light therethrough at a particular wavelength, said sensor array further characterized by having a portion of said coating material omitted to form a window whereby the light output reflected from the sensed document and focused by the reduction lens passes through the coated portion causing a first area of the sensor array to generate output signals representing the position and size of the document being scanned, while unfiltered light reflected from the scanned document passes unfiltered through the window and through the glass causing a second area of the sensor array to generate an output signal which is representative of the background density of the original document.

4. The reproduction machine of claim 2 wherein light reflected from the surface of the document cover overlying said document is outside the wavelength of light transmitted by said interference filter.

5. The reproduction machine of claim 4 wherein said document cover's underside is red and said interference filter material transmits green light.

6. The reproduction machine of claim 2 wherein said document cover is a pivotable platen cover.

7. The reproduction machine of claim 2 wherein said document cover is document conveying belt forming part of a document handling system.

* * * * *

UNITED STATES PATENT AND TRADEMARK OFFICE
CERTIFICATE OF CORRECTION

PATENT NO. : 5,065,185

DATED : November 12, 1991

INVENTOR(S) : Edward A. Powers et al

It is certified that error appears in the above-identified patent and that said Letters Patent is hereby corrected as shown below:

On the title page, insert the following:

--[73] Assignee: Xerox Corporation, Stamford, Conn.--.

Signed and Sealed this

Twenty-fifth Day of May, 1993

Attest:

MICHAEL K. KIRK

Attesting Officer

Acting Commissioner of Patents and Trademarks